United States Patent
Carey et al.

(10) Patent No.: US 7,124,728 B2
(45) Date of Patent: Oct. 24, 2006

(54) MODIFICATION OF LUBRICANT PROPERTIES IN AN OPERATING ALL LOSS LUBRICATING SYSTEM

(75) Inventors: Vincent Mark Carey, Sewell, NJ (US); Kevin John Kelly, Mullica Hill, NJ (US); Kevin Louis Crouthamel, Wycombe, PA (US); Keith Preston Saddler, Fairfax, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 334 days.

(21) Appl. No.: 10/695,063

(22) Filed: Oct. 28, 2003

(65) Prior Publication Data

US 2004/0144355 A1 Jul. 29, 2004

Related U.S. Application Data

(63) Continuation-in-part of application No. 10/350,563, filed on Jan. 24, 2003, now Pat. No. 6,874,459.

(51) Int. Cl.
*F01M 1/00* (2006.01)

(52) U.S. Cl. ..................... 123/196 R; 123/14
(58) Field of Classification Search ............ 123/196 R, 123/196 A, 196 S
See application file for complete search history.

(56) References Cited

U.S. PATENT DOCUMENTS

| | | | | |
|---|---|---|---|---|
| 3,859,218 A | | 1/1975 | Jervis et al. .............. 252/32.5 |
| 3,909,428 A | * | 9/1975 | DeVries et al. ............ 508/409 |
| 5,067,455 A | | 11/1991 | Okajima et al. ........... 123/196 |
| 6,696,393 B1 | * | 2/2004 | Boffa ........................ 508/287 |
| 2003/0159672 A1 | * | 8/2003 | Carey et al. ............ 123/196 R |
| 2004/0023819 A1 | * | 2/2004 | Boffa ........................ 508/230 |
| 2004/0087450 A1 | * | 5/2004 | Boffa ........................ 508/185 |
| 2004/0144355 A1 | * | 7/2004 | Carey et al. ............ 123/196 R |
| 2005/0014659 A1 | * | 1/2005 | Crouthamel et al. ........ 508/436 |

FOREIGN PATENT DOCUMENTS

| | | |
|---|---|---|
| EP | 0645444 A2 | 3/1995 |
| EP | 1191088 A1 | 3/2002 |
| EP | 1314773 A1 | 5/2003 |
| EP | 1437396 A1 | 7/2004 |
| JP | 03194109 | 8/1991 |

OTHER PUBLICATIONS

U.S. Appl. No. 03/0159672, filed Aug. 28, 2003, Carey et al.

\* cited by examiner

*Primary Examiner*—Henry C Yuen
*Assistant Examiner*—Jason Benton
(74) *Attorney, Agent, or Firm*—Joseph J. Dvorak; Gary P. Katz

(57) ABSTRACT

A marine diesel engine system includes a diesel engine having a plurality of cylinders. The system also includes, proximate the engine, a primary engine lubricant and an additive selected from certain alkylamine-alkylphosphates, 500 TBN calcium sulfonate and mixtures thereof. A means for blending the lubricant and additives into a mixture for introduction into a cylinder is provided. Thus lubricant properties may be modified depending upon engine conditions.

7 Claims, 1 Drawing Sheet

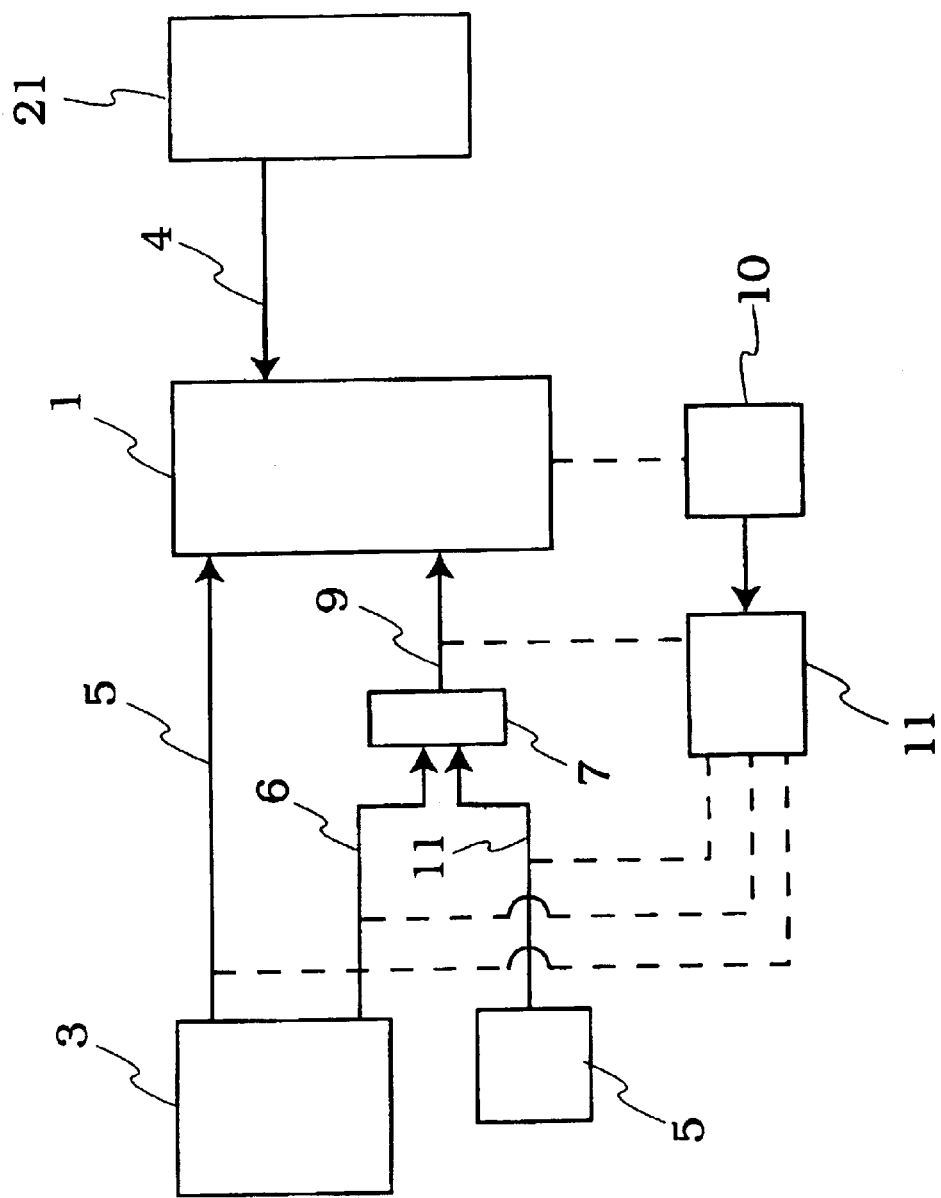

MODIFICATION OF LUBRICANT PROPERTIES IN AN OPERATING ALL LOSS LUBRICATING SYSTEM

CROSS-REFERENCE TO RELATED APPLICATION(S)

This application is a Continuation-in-Part of application Ser. No. 10/350,563 filed Jan. 24, 2003, now U.S. Pat. No. 6,874,459.

FIELD OF INVENTION

The present invention relates generally to the varying of an engine lubricant formulation in response to engine operating conditions. More particularly the invention relates to lubricant components for varying the composition of a marine diesel engine lubricant in response to engine operating conditions.

BACKGROUND OF INVENTION

Diesel engines may generally be classified as slow-speed, medium-speed or high-speed engines, with the slow-speed variety being used for the largest, deep draft marine vessels and in industrial applications. Slow-speed diesel engines are typically direct coupled, direct reversing, two-stroke cycle engines operating in the range of about 57 to 250 rpm and usually run on residual fuels. These engines are of crosshead construction with a diaphragm and stuffing boxes separating the power cylinders from the crankcase to prevent combustion products from entering the crankcase and mixing with the crankcase oil. Medium-speed engines typically operate in the range of 250 to about 1100 rpm and may operate on the four-stroke or two-stroke cycle. These engines are trunk piston design, and many operate on residual fuel as well. They may also operate on distillate fuel containing little or no residua. On deep-sea vessels these engines may be used for propulsion, ancillary applications or both. Slow speed and medium speed marine diesel engines are also extensively used in power plant operations. The present invention is applicable to them as well.

Each type of diesel engine employs lubricating oils to minimize component wear, remove heat, neutralize and disperse combustion products, prevent rust and corrosion and prevent sludge formation or deposits. Experience has shown, however, that no single lubricant formulation can provide optimum protection against all of the various deleterious conditions to which an engine may be exposed. Therefore, lubricants typically are formulated to provide at least satisfactory performance for the range of expected engine operating conditions. For some lubricant applications such as in lubricating cylinders in crosshead diesel engines that employ all-loss lubrication systems and combust heavy fuel oil with widely varying sulfur contents, the engine lubrication requirements vary to such a large degree and with sufficient frequency that one lubricant formulation may not provide adequate performance over the full range of operating conditions. This inability can result in at least increased engine maintenance needs and more typically unnecessary expense as a result of repair costs, down time and excessive oil usage. Thus there is a need for being able to vary the composition of a lubricant in response to an engine's actual lubrication requirements.

One object of the invention is to provide lubricant components for real time varying all-loss, diesel engine's cylinder lubricant properties in accordance with the engines operating requirements.

Another object of the invention is to provide a low speed diesel engine oil with improved acid-corrosion protection for operation during conditions when corrosive wear is high.

These and other objects will become apparent from the detailed description which follows:

SUMMARY OF INVENTION

Broadly stated, in one aspect the invention includes lubricant components for lubricating a low speed diesel engine cylinder operating under a range of corrosive and abrasive wear operating conditions comprising a primary low speed diesel engine cylinder lubricant and a performance enhancing antiwear and anticorrosive additive selected from the group consisting essentially of (i) an alkylamine-alkylphosphate having at least 1.25 equivalents of alkylamine to 1.0 equivalents of alkylphosphate, (ii) 500 TBN calcium sulfonate, and (iii) mixtures thereof; and means proximate the engine for blending the primary lubricant and additive into a mixture for introduction into the engine when operating conditions require.

In a second aspect, the invention is a method for lubricating the cylinder of a two-stroke, cross-head, marine diesel engine which comprises supplying to the walls of the cylinder a primary low speed diesel engine cylinder lubricant under low wear and corrosion operating conditions and under increased wear and corrosion operating conditions supplying the primary lubricant to the cylinder blended with an antiwear and anti corrosion amount of an additive selected from the above defined group.

In a third aspect, the invention comprises a method for increasing the TBN of an SAE 50 grade lubricant from about 40 TBN to about 100 TBN without substantially affecting the SAE grade by adding to the lubricant of about 40 TBN a sufficient amount of 500 TBN calcium sulfonate.

BRIEF DESCRIPTION OF DRAWING

The accompanying FIGURE schematically illustrates a method for practicing the present invention.

DETAILED DESCRIPTION OF INVENTION

The lubricating component for lubricating a low speed diesel engine cylinder operating under a range of corrosive and abrasive wear conditions comprise a primary slow speed, two stroke, marine diesel engine lubricant and a performance enhancing antiwear and/or anti corrosive additive.

The primary lubricant comprises a major amount of at least one oil of lubricating viscosity. Thus natural or synthetic oils or mixtures thereof may be used. Natural oils include mineral oils, vegetable oils, solvent treated mineral oils and the like. Synthetic oils include polyalpha olefins, polyol esters, poly internal olefins, polyethylenes, propylenes, polybutenes, polyethyleneglycols, polypropyleneglycols, polyalkyleneglycols, their mixtures and the like, other functional fluids, such as alkylated aromatics, perfluoroalkylpolyethers, polyphenyl ethers, cycloaliphatics, phosphate esters, dialkyl carbonates, silicones, silahydrocarbons, phosphazenes, etc. In general the viscosity of the base oil blend of the primary lubricant herein is in the range of about 5 to about 30 cSt at 100° C.

The primary lubricant also will include effective amounts of at least one of other additives such as metal detergents, antioxidants, dispersants, pour point depressants, demulsifiers, defoamants, aromatic rich solubilizers, extreme pressure and antiwear additives.

Useful dispersants include succinimides, succinic acid esters, amides borated succinimides and the like. These typically will be present in an amount between about 0.10 to about 5.0 wt % based on the total weight of the primary lubricant.

Suitable metal detergents include calcium and magnesium phenates, sulfonates, salicylates and the like. Typically these will be present from about 0.50 wt % to about 30.0 wt % based on the total weight of the primary lubricant.

Suitable antioxidants include hindered phenols, arylamines and mixtures thereof. The amount of antioxidants typically will be in the range of 0.1 wt % to 2.0 wt % based on the weight of the primary lubricant.

The aromatic rich solubilizers that are useful in the composition of the invention include alkylated aromatics such as alkylated benzenes, alkylated toluenes, alkylated naphthylenes, alkylated biphenyls and alkylated diphenyl methane. The solubilizer will constitute about 0.20 wt % to about 15.0 wt % of the total primary lubricant.

Other components that optionally are included in the primary lubricant include anti-foamants, pour point depressants, demulsifiers, extreme pressure agents, antiwear agents, dyes and the like.

A preferred primary lubricant as a component for use in lubricating a two-stroke, low speed diesel engine cylinder combusting a diesel fuel having from about 0.5 wt % to about 5.0 wt % sulfur, typically will comprise from about 65 wt % to about 90 wt % of a mixture of heavy neutral base oil with a thickening component and from about 10 wt % to about 35 wt % of a combination of the above described additives.

One suitable antiwear and anti corrosive performance enhancing additive of the lubricant components comprises an alkylamine-alkylphosphate having at least 1.25 equivalents of alkylamine to 1.0 equivalent of alkylphosphate and a nitrogen to phosphorous weight ratio of at least 0.5. In general the ratio, in equivalents of alkylamine to alkylphosphate will range from 1.25:1 to 20:1 and a nitrogen to phosphorous weight ratio of 0.5 to 8 and preferably from 1.5:1 to 5:1 equivalents and a nitrogen to phosphorous weight ratio of 0.6 to 2.

Suitable alkylphosphates are mono and dialkylphosphates and mixtures thereof represented by the formulas I and II:

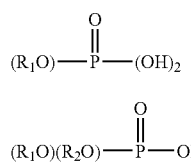

where $R_1$ and $R_2$ are the same or different alkyl groups of from about 4 to about 30 carbon atoms and preferably from 6 to 11 carbon atoms. Particularly preferred is a mixture of mono and dialkylphosphates.

Another suitable antiwear and anti corrosive performance enhancing additive of the lubricant components is 500 TBN calcium sulfonate. Indeed 500 TBN calcium sulfonate has been found to be capable of increasing the TBN of an SAE 50 grade lubricant from about 40 to about 100 without changing the SAE grade of the lubricant.

Mixtures of the alkylamine-alkylphosphate and calcium sulfonate additives may also be used in the practice of the present invention.

In the invention mixing and pumping means are provided proximate a low speed diesel engine for blending the primary lubricant and one or more of the additives into a mixture and supplying the mixture to the engine when engine operating conditions require.

The amount of the alkylamine-alkylphosphate additive blended with the primary lubricant will be a minor, but effective amount, typically ranging from about 0.05 wt % to about 2.5 wt % based on the total weight of the blended mixture. The amount of the 500 TBN calcium sulfonate additive blended with the lubricant of about 40 TBN typically will be up to about 15 wt % based on the total weight of the blended mixture.

The mixing means employed may be any suitable means such as stirring devices, venturi type devices, static mixers, nozzles and the like.

The pumping means employed may be any suitable means such as centrifugal, rotary, fan and displacement type pumps and the like.

Determining when engine operating conditions require supplying the mixture to the engine may be based, for example, on the operator's experience and knowledge or on measurement of an actual engine condition parameter, or measurement of the properties, or condition or both of the cylinder liner scrape-down oil.

In one embodiment the primary lubricant is supplied to a low speed diesel engine combusting fuel with lower sulfur levels fuel, e.g., fuel containing about 0.5 to 2.0 wt % sulfur, and the blend is supplied when combusting a higher sulfur level fuel, e.g., fuel containing greater than 2.0 to about 5.0 wt % sulfur.

In another embodiment an engine condition parameter is measured or predicted from other engine or fuel parameters and blending is performed in response to the measured or predicted parameter.

The invention is now illustrated by reference to the drawing which schematically shows a crosshead diesel engine 1 with a base cylinder oil tank 3 containing a primary lubricant. A second storage tank 5 contains the additive of the present invention. A storage tank 2 for fuel also is provided for supplying fuel to the engine 1 via feed line 4.

The engine lubricant requirements may be directly or predictively measured. For direct measurement, as a non-limiting example, the metal or metal oxide content of the scrape down oil leaving the cylinder (not shown) of engine 1 may be determined. Predictive measurements may include determining the TBN of the scrape down oil, the sulfur content of the fuel, the load on the engine, or the cylinder temperature. Based on the measured or predictive engine parameter the primary lubricant is supplied directly via line 5 to the engine 1 or the primary lubricant is supplied via line 6 to blending means 7 and additive is supplied via line 8 to blending means 7 to generate a mixture which is supplied to engine 1 via line 9.

In a preferred embodiment the measured or predictive parameter is entered into a computing device 10 operatively connected to a control device 11. The computing device 10 is programmed to determine lubricant requirements based on its input and to provide the control device 11 with that determination. The control device 11 is operatively connected to primary lubricant, additive and mixture sources, for example, so as to automatically meter one or all of primary lubricant, additive and mixture as required.

EXAMPLES

The following examples serve to illustrate the invention and its attendant benefits.

Example 1

A commercial marine test engine was operated for 1000 hours using a fully formulated commercial marine oil as a reference for comparison and the same commercial oil to which 0.5 wt % of Mobilad C-423 was added. Mobilad C-423 is a $C_{11}$–$C_{14}$ monoalkylamine-$C_8$ mono and dialkylphosphate additive having 1.75 equivalents of amine per equivalent of phosphates. The cylinder oil feed rate was approximately 25% lower than that used in a typical commercial engine operation thereby placing typical more stress on the cylinder oil. Wear data for cylinder rings and liners was obtained. The results are presented in Table I.

particles) appear, measuring the volume percent of such precipitate. In Table II, Tr is trace, F is floc and HF is heavy floc.

TABLE II

| Description | Comparative 2 Oil 1 | Example 2 Oil 1 + 500 TBN Calcium Sulfonate | Comparative 3 Oil 1 + 300 TBN Calcium Sulfonate | Comparative 4 Oil 1 + 400 TBN Calcium Sulfonate | Comparative 5 Oil 1 + 600 TBN Magnesium Sulfonate | Comparative 6 Oil 1 + 400 TBN Calcium Phenate |
|---|---|---|---|---|---|---|
| Kinetic Viscosity @400° C. | 218.2 | 235.5 | 275.2 | 250.2 | 225.6 | 260.3 |
| Kinetic Viscosity @100° C. | 19.74 | 21.77 | 24.10 | 22.39 | 20.90 | 22.71 |
| Viscosity Index | 103.4 | 111.1 | 110.4 | 108.9 | 109.8 | 106.9 |
| SAE Grade | 50 | 50 | 60 | 60 | 50 | 60 |
| TBN | 39.7 | 99.3 | 101.6 | 102.1 | 98.6 | 99.2 |
| Storage Stability Room Temp. (Clarity/Vol % Sediment) | | | | | | |
| Initial | Tr Haze/Nil | Tr Haze/Nil | Tr Haze/Nil | Tr Haze/Nil | Tr Haze/Nil | Tr Haze/Nil |
| 1 Day | Tr Haze/Nil | Tr Haze/Nil | Tr Haze/Nil | Tr Haze/Nil | Tr Haze/Nil | Tr Haze/Nil |
| 4 Days | Tr Haze/Nil | Tr Haze/Nil | Tr Haze/Nil | Tr Haze/Nil | Tr Haze/2.0 HF | Tr Haze/Nil |
| 15 days | Tr Haze/Nil | Tr Haze/Nil | Tr Haze/Nil | Tr Haze/Nil | Hvy/Haze/100 HF | Tr Haze/Nil |
| Storage Stability, 70° C. (Clarity/Vol % Sediment) | | | | | | |
| Initial | Tr Haze/Nil | Tr Haze/Nil | Tr Haze/Nil | Tr Haze/Nil | Tr Haze/Nil | Tr Haze/Nil |
| 1 Day | Tr Haze/Nil | Tr Haze/Nil | Tr Haze/Nil | Tr Haze/Nil | Hvy Haze/100 HF | Tr Haze/Nil |
| 4 Days | Tr Haze/Nil | Tr Haze/Nil | Tr Haze/Nil | Tr Haze/Nil | Tr Haze/75 F | Tr Haze/Nil |
| 15 Days | Clear/0.03 | Tr Haze/Nil | Tr Haze/Nil | Tr Haze/Nil | Clear/30 F | Tr Haze/Nil |

TABLE I

| | Comparative 1 | Example 1 | % Difference |
|---|---|---|---|
| Average Top Ring Wear Rate, mm/1000 hrs | 0.66 | 0.62 | −6% |
| Maximum Top Ring Wear Rate, mm/1000 hrs | 0.77 | 0.77 | 0% |
| Average Liner Diametral Wear Rate, Full Depth (Subto), mm/1000 hrs | 0.023 | 0.024 | 4% |
| Max. Liner Diametral Wear Rate, Full Depth (Subto), mm/1000 hrs. | 0.134 | 0.126 | −6% |
| Ave. Liner Wear Rate, Top Only (Dimples), mm/1000 hrs. | 0.027 | 0.008 | −70% |
| Max. Liner Radial Wear Rate, mm/1000 hrs | 0.099 | 0.042 | −58% |

Example 2

A series of oil compositions were prepared by blending a TBN 40 marine engine oil, oil 1, with different, high TBN additives. The additives used and their amounts are given in Table II. Also given in Table II is the viscosity, the VI, the SAE grade, TBN and storage stability data for each compositions. The storage stability data is obtained by storing the sample at the temperature and for the time period given in Table II and when noticeable sediment or floc (suspended

What is claimed is:

1. A marine diesel engine system comprising:
a slow-speed cross head marine diesel engine with at least one cylinder;
cylinder lubricant components proximate the engine, the components comprising: (i) a primary lubricant and (ii) an additive selected from the group consisting essentially of (i) an alkylamine-alkylphosphate having at least 1.25 equivalents of alkylamine to 1.0 equivalents of alkylphosphate and a nitrogen to phosphorous weight ratio of at least 0.5, (ii) 500 TBN calcium sulfonate, and (iii) mixtures thereof; and
means for blending the primary lubricant and additive into a mixture for introduction into the cylinder when engine conditions require the mixture.

2. The system of claim 1 including means for measuring one or more engine parameters and calculating from the measured parameters the engine operating conditions thereby determining when the mixture is required.

3. The system of claim 1 wherein the alkylphosphate is a mixture of mono- and dialkyl phosphates having the formulae I and II

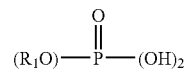

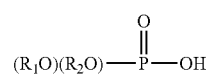

where $R_1$ and $R_2$ are the same or different alkyl groups of from about 4 to about 30 carbon atoms and wherein the alkyl amine is selected from linear and branched mono and dialkyl amines and mixtures thereof having from about 6 to about 50 carbon atoms.

4. A method for lubricating one or more cylinders of a cross-head marine diesel engine based on the requirement for an enhanced wear and corrosion resistant lubricant comprising:

measuring one or more engine condition parameters;

calculating from the measured parameters each cylinder's requirement for an enhanced wear and corrosion resistant lubricant; and (i) when a cylinder does not require an enhanced lubricant, lubricating the engine cylinder with a primary engine lubricant (ii) and when a cylinder requires an enhanced lubricant, mixing the primary lubricant with an effective amount of an additive selected from the group consisting essentially of (i) alkylamine-alkylphosphate additive having at least 1.25 equivalents of alkylamine to 1.0 equivalents of alkylphosphate and a nitrogen to phosphorous weight ratio of at least 0.5, (ii) 500 TBN calcium sulfonate, and (iii) mixtures thereof; thereby forming a mixture; and lubricating the cylinder with the mixture.

5. The method of claim 4 wherein the alkylphosphate is a mixture of mono- and dialkyl phosphates having the formulae I and II

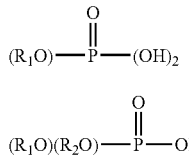

where $R_1$ and $R_2$ are the same or different alkyl groups of from about 4 to about 30 carbon atoms and wherein the alkyl amine is selected from linear and branched mono and dialkyl amines and mixtures thereof having from about 6 to about 50 carbon atoms.

6. A method for lubricating one or more cylinder's of a two stroke cross head marine engine comprising:

lubricating the cylinder with a primary lubricant when combusting a fuels containing sulfur levels of about 0.5 wt % to 2.0 wt %; and lubricating the cylinder when combusting fuels containing sulfur levels greater than 2.0 wt % to about 5.0 wt % with a mixture of a primary lubricant and an additive selected from the group consisting essentially of (i) an alkylamine-alkylphosphate having at least 1.25 equivalents of alkylamine to 1.0 equivalents of alkylphosphate and a nitrogen to phosphorous weight ratio of at least 0.5, (ii) 500 TBN calcium sulfonate and (iii) mixtures thereof.

7. The method of claim 6 wherein the alkylphosphate is a mixture of mono- and dialkyl phosphates having the formulae I and II

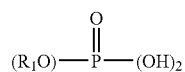

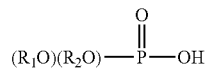

where $R_1$ and $R_2$ are the same or different alkyl groups of from about 4 to about 30 carbon atoms and wherein the alkyl amine is selected from linear and branched mono and dialkyl amines and mixtures thereof having from about 6 to about 50 carbon atoms.

* * * * *